United States Patent [19]

Ito et al.

[11] Patent Number: 4,858,042
[45] Date of Patent: Aug. 15, 1989

[54] CASSETTE INSERTION DETECTING MECHANISM

[75] Inventors: Yukio Ito; Kimichika Yamada; Hiroyuki Ohkawa, all of Tokyo, Japan

[73] Assignee: Clarion Co., Ltd., Tokyo, Japan

[21] Appl. No.: 100,217

[22] Filed: Sep. 23, 1987

[30] Foreign Application Priority Data

Sep. 30, 1986 [JP] Japan .................................. 61-232210
Sep. 30, 1986 [JP] Japan .................................. 61-232209
Sep. 30, 1986 [JP] Japan .................................. 61-149813[U]

[51] Int. Cl.⁴ ............................................ G11B 15/00
[52] U.S. Cl. ...................................... 360/96.5; 360/71
[58] Field of Search ................. 360/96.5, 71, 85, 93, 360/96.1, 96.6

[56] References Cited

U.S. PATENT DOCUMENTS

| | | | |
|---|---|---|---|
| 4,320,424 | 3/1982 | Murayama | 360/71 |
| 4,424,540 | 1/1984 | Naoi | 360/71 |
| 4,586,096 | 4/1986 | Okada | 360/96.5 |
| 4,628,383 | 12/1986 | Miyamoto | 360/96.5 |

FOREIGN PATENT DOCUMENTS

| | | | |
|---|---|---|---|
| 0129185 | 12/1984 | European Pat. Off. | 360/96.5 |
| 0084068 | 6/1980 | Japan | 360/96.5 |
| 0026362 | 2/1983 | Japan | 360/96.5 |
| 0014173 | 1/1984 | Japan | 360/96.5 |

*Primary Examiner*—Stuart N. Hecker
*Assistant Examiner*—David J. Severin
*Attorney, Agent, or Firm*—Flynn, Thiel, Boutell & Tanis

[57] ABSTRACT

A cassette insertion detection mechanism includes stoppers provided independently of a cassette holder and configured to hold one end surface of a cassette. The stoppers are movable with respect to the cassette holder and resiliently biased toward a front direction of the cassette holder. The stoppers turn on or off insertion detecting switches provided on side walls of a tape recording apparatus to activate a cassette loading driving motor to proceed a cassette loading operation when both insertion detecting switches are turned on or off by the stoppers.

3 Claims, 5 Drawing Sheets

CASSETTE INSERTION DETECTING MECHANISM

FIELD OF THE INVENTION

This invention relates to a cassette insertion detecting mechanism configured to detect insertion of a cassette into a cassette holder so as to proceed cassette loading operation only when the inserted cassette takes a proper angular position with respect to the cassette holder.

BACKGROUND OF THE INVENTION

As a result of remarkable technical progress in recent years, tape recorders, video decks or other cassette type magnetic recording apparatuses, in general, are configured to activate a cassette loading driving motor when a cassette is inserted by a predetermined stroke, so as to automatically conduct a further movement of the cassette (cassette loading) to a play position, using a motor driving power.

In such a cassette loading mechanism, if a cassette is manually inserted in an inclined configuration, and if the inclined cassette i automatically transported further, the cassette hits opposed walls or other members in the recording apparatus, and often injures the apparatus and itself.

In this connection, some prior art cassette type magnetic recording apparatus includes a cassette insertion detecting mechanism for detecting whether an inserted cassette takes a proper angular position with respect to a cassette holder or not, so that a subsequent loading operation is taken only when the cassette takes the proper position.

The Assignee of this application already proposed a cassette insertion detecting mechanism in which a cassette holder is divided into right and left halves which can be driven independently, and a detection switch provided on a side wall of the apparatus detects the position of the cassette holder (Japanese patent application No. 166054/1986).

As compared to an old arrangement in which a detection switch is supported on a cassette holder which is a movable member, the aforegoing Applicant's improvement supports the detection switch on a side wall which is a fixed member in the apparatus, and this permits omission of lead wires or flexible board for wiring. Therefore, the Applicant's prior art mechanism is excellent in durability and contributes to a dimensional reduction of the apparatus. However, it also involves the following problems.

When the positions of both cassette holder halves are detected upon insertion of a cassette, the cassette holder halves start their motions with the energy of a driving motor. After this, if the cassette is removed from the apparatus before moved to its loading position, the mechanism undertakes a cassette loading operation in absence of the cassette, because the apparatus does not include any means which detects such an interrupting removal of the cassette to stop a subsequent cassette loading operation.

This problem will be overcome by using an insertion detecting member configured to slide while engaging a cassette and also movable with respect to the cassette holders. However, this arrangement requires a vertical overlapping configuration of the bottom plates of the cassette holders and the insertion detecting member, and hence unables vertical dimensional reduction of the apparatus.

OBJECT OF THE INVENTION

It is therefore an object of the invention to provide a cassette insertion detecting mechanism not only detecting whether a manually inserted cassette takes a proper angular position with respect to a cassette holder but also reliable detecting removal of a halfway inserted cassette to stop a subsequent cassette loading operation.

A further object of the invention is to provide an ejection detecting mechanism which reliably detects the position of the cassette holder to stop an ejection driving motor when the cassette holder reaches its terminal position to complete its cassette ejecting operation.

SUMMARY OF THE INVENTION

According to the invention, a cassette insertion detecting mechanism includes a cassette holder divided into right and left halves which can be driven independently. Stoppers or other insertion detecting members are provided independently of the cassette holder to support one end surface of a cassette. The stoppers or other detecting members are mounted movably with respect to the cassette holder and biased by a spring toward the front end of the cassette holder. Insertion detecting switches supported on side walls of the apparatus to detect positions of the stoppers to activate a cassette loading driving motor only when both insertion detecting switches detect the stoppers.

With this arrangement, insertion of a cassette is known by detecting the right and left stoppers so that a subsequent loading operation is effected only when the cassette takes a proper angular position with respect to the cassette holder. Further, if the cassette is removed after the loading operation is started and before it is completed, the stoppers return to their front positions under the energy of the springs, and the insertion detecting switches detect removal of the cassette, and stop the cassette loading operation.

BRIEF DESCRIPTION OF THE DRAWINGS

FIG. 5 shows the configuration after removal of a cassette.

DETAILED DESCRIPTION

The invention is described below in detail, referring to drawings illustrating a preferred embodiment of a cassette insertion detecting mechanism according to the invention. The mechanism is substantially symmetrical in its right and left halves, and the drawings merely shown the left half.

Figure 1:
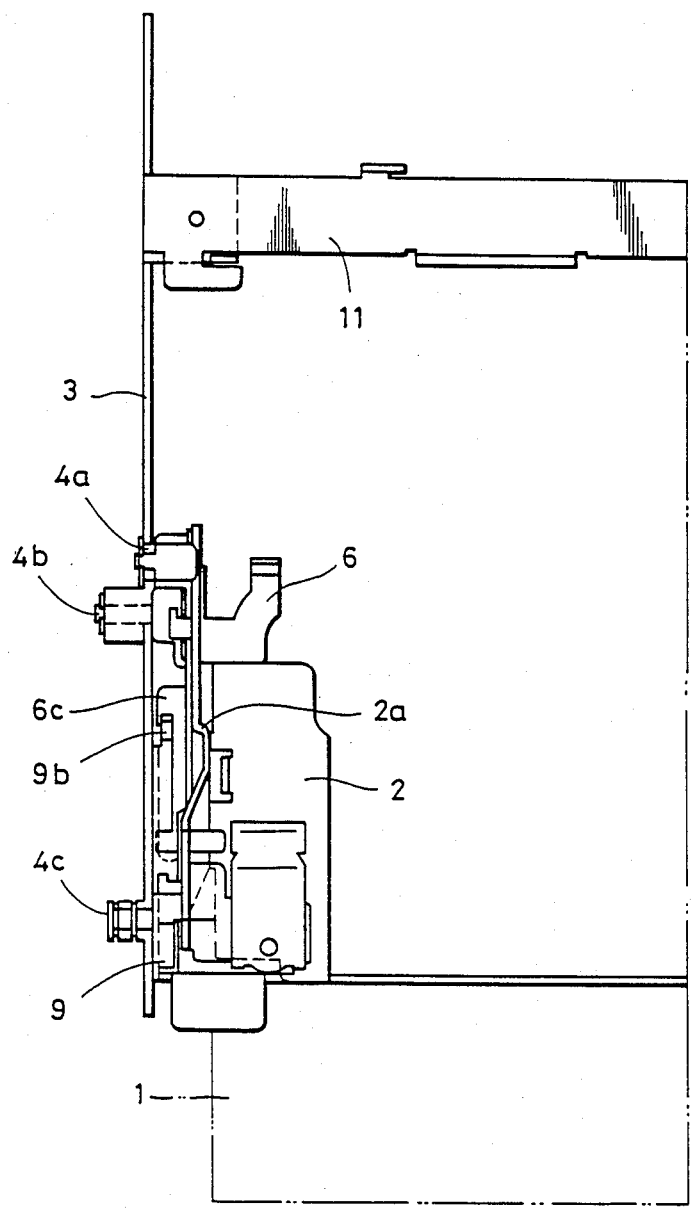
FIG. 1 is a plan view of a left half of a cassette insertion detecting mechanism embodying the invention.

As shown in FIG. 1, a cassette holder 2 holding a cassette 1 is supported by right and left side walls 3 of the apparatus movably back and forth.

Figure 2:
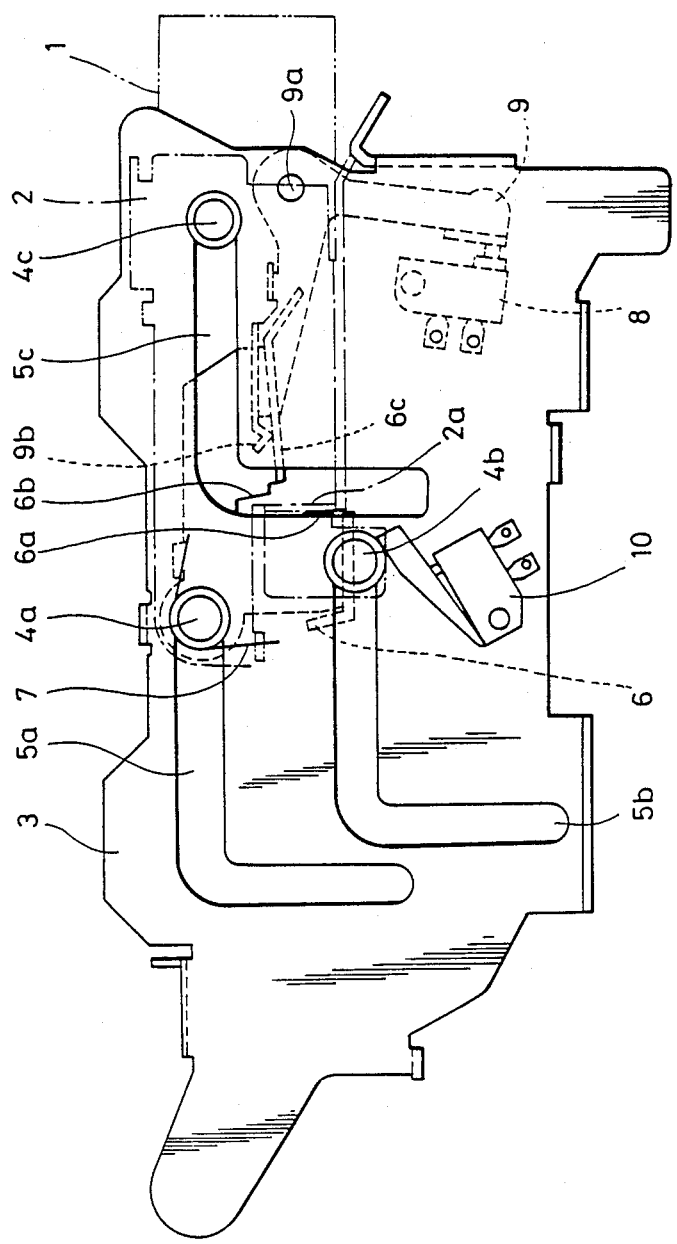
FIGS. 2 through 5 are left side elevations of the same embodiment, in which FIGS. 2 through 4 stepwisely show configurations from cassette insertion to the start of a cassette loading operation.

As shown in FIG. 2, the cassette holder 2 has guide pins 4a through 4c at three positions for slidable movement in L-shaped guide grooves 5a through 5c provided in the side wall 3.

A stopper 6 holding one end surface of the cassette 1 is mounted on a rear portion (left-hand portion in the drawing) of the cassette holder 2 pivotably about a pin 4a, and is biased frontwardly (counterclockwise in the drawing) by a spring 7. The stopper 6 has an engage surface 6a for engagement with an engage portion 2a of the cassette holder 2 and includes a push surface 6b so that the stopper 6 is blocked in its forward movement by engagement between the engage surface 6a and the engage portion 2a and pushes the cassette holder 2 via the push surface 6b in its rearward movement.

In front portions inside the side wall 3 are mounted an insertion detecting switch 8 and a switch push member 9. The switch push member 9 is pivotable about a shaft 9a and biased by a spring (not shown) in a direction away from the insertion detecting switch 8. The switch push member 9 has an engage portion 9b for engagement with the stopper 6 of the cassette holder 2. When the stopper 6 takes a front position before cassette insertion, the switch push member 9 is held by a regulating member 6c of the stopper 6 in a position for pushing (turning on) the insertion detecting switch 8. When the stopper 6 is urged more than a predetermined amount by insertion of a cassette, the switch push member 9b is released from the regulating member 6c due to a rearward rotation of the stopper 6, and moves away from the insertion detecting switch 8 under the energy of the spring to turn off the switch 8.

The side plate 3 includes an eject switch 10 located under a rear guide groove 5b. The eject switch 10 is pushed into its on-configuration by a guide pin 4b inserted in the guide groove 5b only when the guide pin 4b takes its front-limit position. When the cassette holder 2 begins its forward movement, the eject switch 10 is released from the guide pin 4b and returns back to its off-configuration. The eject switch 10, unlike the other members, is not provided on the other (right-hand) side plate 3 (not shown).

Right and left insertion detection switches 8—8 and the eject switch 10 are connected in series, so that a control means (not shown) activates the cassette loading driving motor to drive the right and left cassette holders 2 only when both insertion detecting switches 8—8 are turned off and the eject switch 10 is turned off succeedingly.

In FIG. 1, reference numeral 11 denotes a connection plate bridging the right and left side plates 3—3.

With this arrangement, the embodiment operates as follows.

Before the cassette 1 inserted, the cassette holder 2 takes the front-limit position as shown in FIG. 2, and the stopper 6 is held at its front position by the energy of the spring 7, with its engage surface 6a being engaged by the engage portion 2a of the cassette holder 2.

When the cassette 1 is inserted slightly from the cassette insertion starting position shown in FIG. 2, the opposed end of the cassette 1 pushes the stopper 6 and rotates it rearwardly (clockwisely in the drawing) against the energy of the spring 7. As a result, the regulating portion 6c of the stopper 6 moves to its non-regulating position, and the switch push member 9 now released from the regulating portion 6c rotates in the counterclockwise direction in the drawing away from the insertion detecting switch 8 to turn it off. The rotated stopper 6 engages the engage portion 2a of the cassette holder 2 at its push surface 6b, and takes its rear-limit position with respect to the cassette holder 2.

Figure 3:
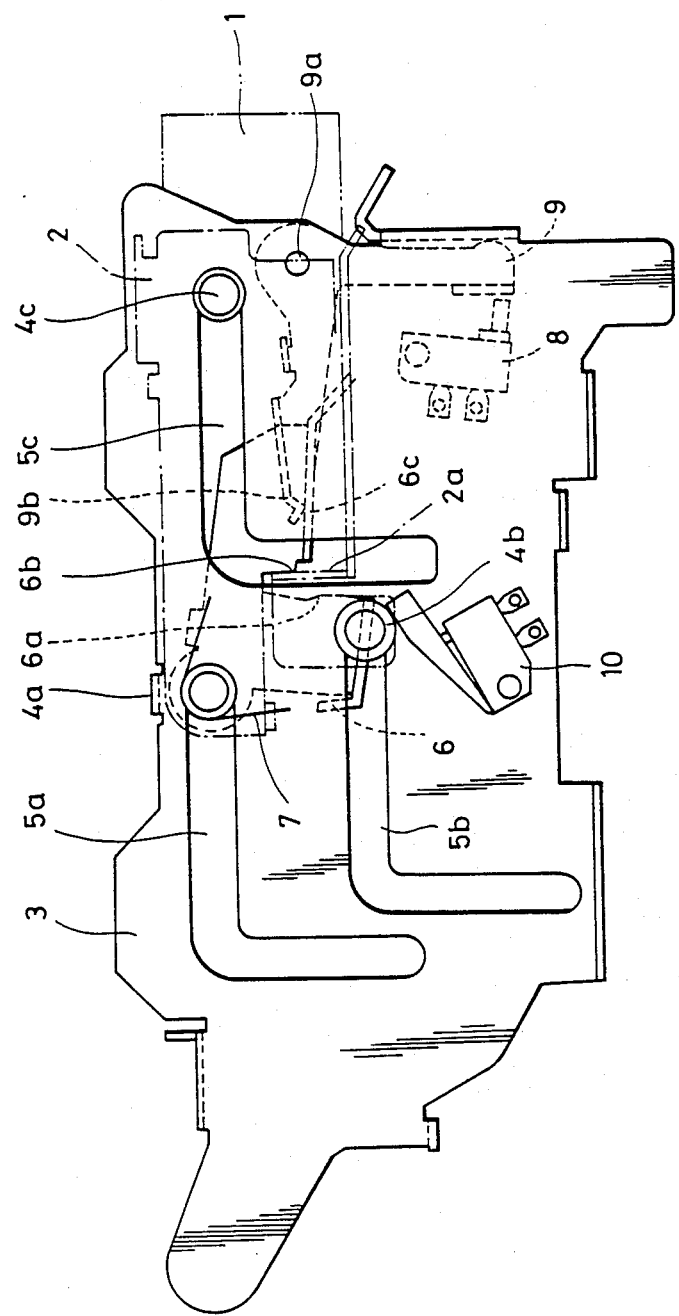
Figure 4:
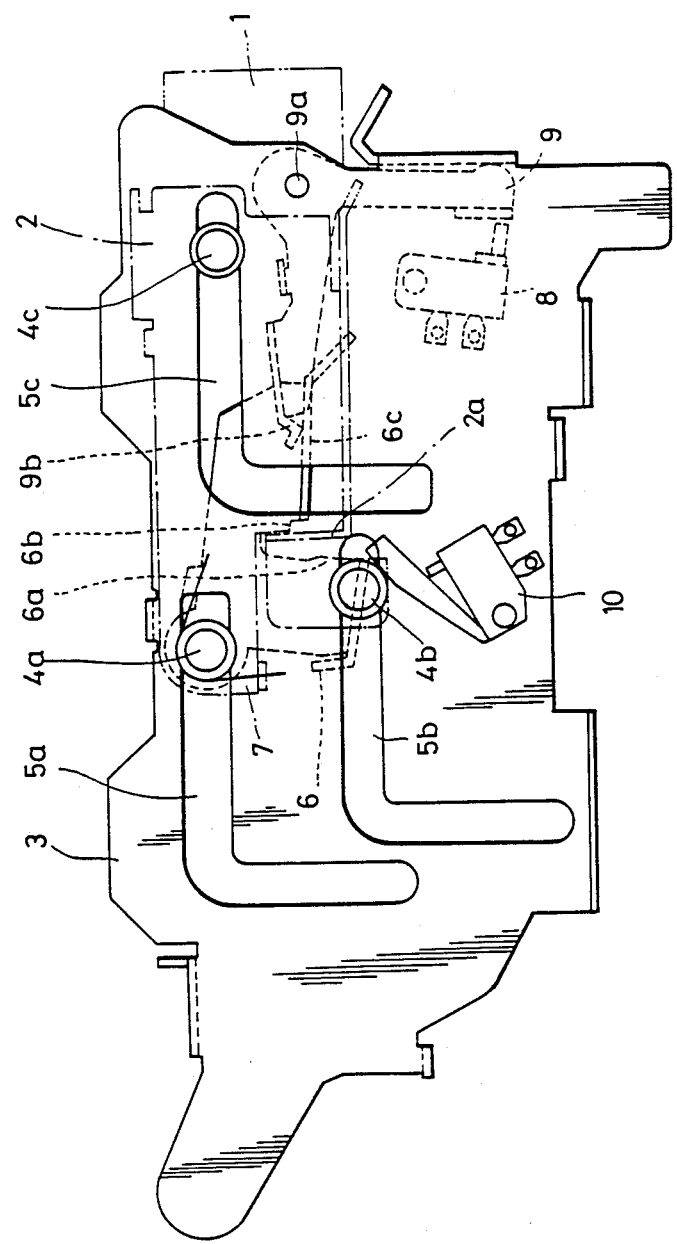
Figure 5:
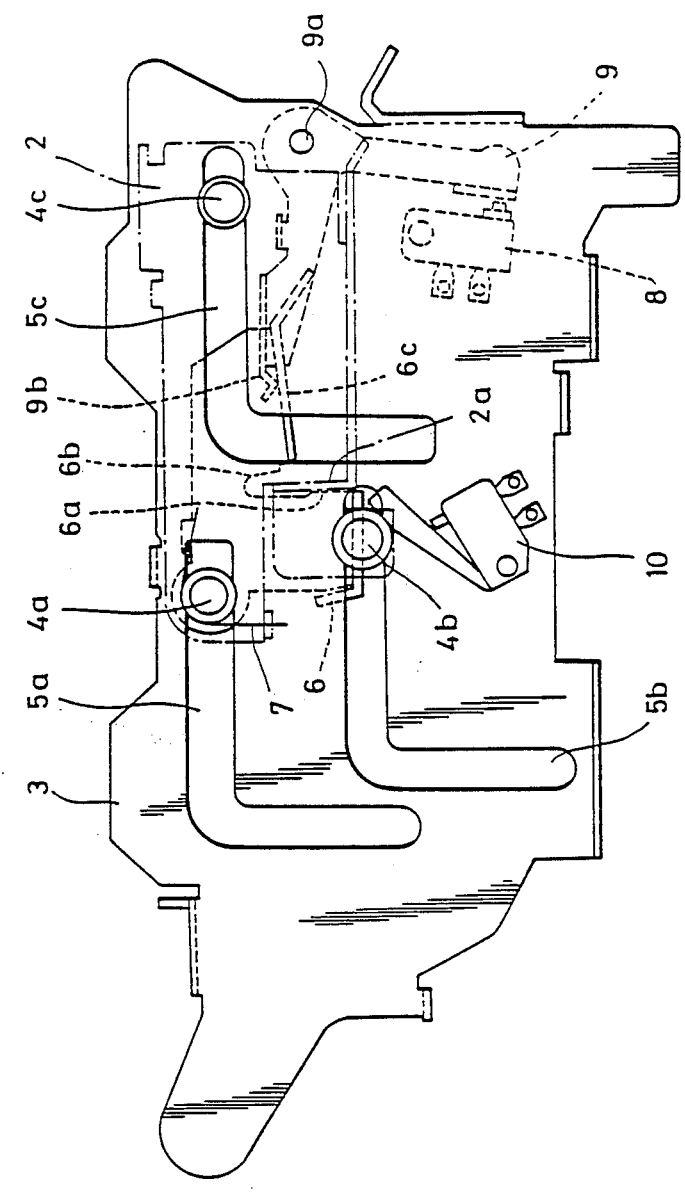

When the cassette 1 is further inserted from the configuration of FIG. 3, the pushing force is applied to the engage portion 2a of the cassette holder 2 via the push surface 6b of the stopper 6, and the cassette holder 2 begins its inward movement. As a result, the eject switch 10 heretofore held in its on-configuration by the guide pin 4b is released from the guide pin 4b as shown in FIG. 4 and returns back to its off-configuration.

Therefore, the right and left insertion detecting switches 8—8 and the eject switch 10 now take their off-configurations, and the control means activates the cassette loading driving motor, so that the cassette holder 2 automatically effects a loading operation thereafter.

When the cassette 1 is removed after the loading operation by the motor is commenced, the prior art cassette insertion detecting mechanism could not detect the removal. In contrast, according to the invention, since the stopper 6 is movable with respect to the cassette holder 2, the stopper 6, upon removal of the cassette 1, returns back to its front position under the energy of the spring 7. As a result, the switch push member 9 rotates in its switch pushing direction to turn on the switch 8, and removal of the cassette 1 is detected. Therefore, the control means can stop the cassette loading operation or return respective members to their stand-by positions taken before cassette insertion.

Upon cassette ejection, the cassette loading driving motor is rotated in the opposite direction to drive the cassette holder from a rear position to its front-limit position. Therefore, the guide pin 4b of the right-hand cassette holder 2 moves back to its front position and pushes the eject switch 10 into its on-configuration. As a result, the driving motor is stopped, and the ejecting operation is completed.

Further, according to the embodiment, since the stopper used as the insertion detecting member and integrally formed with the cassette holder at a rear portion thereof is provided as a pivotable independent member, the arrangement is very simple, and it is not necessary to overlap the stopper with the bottom plate of the cassette holder. This contributes to a reduction in vertical dimension of the apparatus.

The invention is not limited to the aforegoing embodiment. Configurations and positions of respective members may be selected adequately. Further, the insertion detecting switch may be configured to take its on-configuration upon cassette insertion.

The insertion detecting member is not limited to the stopper. It is possible to provide the cassette holder with a stopper as in the prior art apparatus and uses a small-scaled insertion detecting member mounted adjacent the conventional stopper.

Additionally, on and off configurations of the insertion detecting switches and the eject switch may be selected as desired. It is possible to locate the eject switch in a slightly inward position of the illustrated position and to activate a timer upon detection of the switch to stop the cassette holder a predetermined movement later than the detection. Additionally, it is not necessary to use the eject switch as a loading starting switch, and the invention may be used in the same fashion in an apparatus in which the cassette loading driving motor is independent of an eject driving motor.

As described above, according to the invention, cassette insertion is reliably detected by the simple arrangement in which detection of cassette insertion is performed via the stopper mounted in a rear position of the right and left cassette holders movably with respect thereto. Further, when the cassette is removed after the cassette loading operation is commenced, the removal is reliably detected.

What is claimed is:

1. A cassette insertion detecting mechanism used in a cassette-type magnetic recording apparatus to detect insertion of a cassette into a cassette holder divided into right and left halves and to produce a subsequent cassette loading operation only when the cassette is properly positioned with respect to the cassette holder, said mechanism comprising:
- a movable cassette holder having right and left halves and driven by a cassette loading driving motor;
- insertion detecting members supported on said halves of said cassette holder for pivotal movement relative thereto, resiliently biased toward a front direction of said cassette holder, and pivotably moved in a rear direction against the resilient force upon insertion of a cassette;
- right and left side plates supporting and guiding said cassette holder;
- right and left insertion detecting switches supported on said side plates and turned on or off by said insertion detecting members; and
- loading control means configured to activate the cassette loading driving motor to produce a cassette loading operation when both said insertion detecting switches are turned on or off by said insertion detecting members;
- wherein said insertion detecting members are stoppers mounted on rear positions of said halves of said cassette holder movably with respect thereto, and are configured to hold one end of the cassette under said frontward resilient force.

2. A cassette insertion detecting mechanism of claim 1 further comprising:
- an eject switch for detecting, a position of one of said cassette holder halves; and
- an eject control means deenergizing an eject driving motor to complete an ejecting operation when said eject switch is turned on or off upon detection of the position of said cassette holder half.

3. A cassette insertion detecting mechanism used in a cassette-type magnetic recording apparatus to detect insertion of a cassette into a cassette holder divided into right and left halves and to produce a subsequent cassette loading operation only when the cassette is properly positioned with respect to the cassette holder, said mechanism comprising:
- a movable cassette holder having right and left halves and driven by a cassette loading driving motor;
- insertion detecting members and means supporting said insertion detecting members for pivotal movement relative to said cassette holder, said insertion detecting members being resiliently biased toward a front direction of said cassette holder and being pivotably moved in a rear direction against the resilient force upon insertion of a cassette;
- right and left side plates supporting and guiding said cassette holder;
- right and left insertion detecting switches supported on said side plates and turned on or off by said insertion detecting members; and
- loading control means configured to activate the cassette loading driving motor to produce a cassette loading operation when both said insertion detecting switches are turned on or off by said insertion detecting members;
- wherein said insertion detecting members are stoppers mounted on rear positions of said halves of said cassette holder movably with respect thereto, and are configured to hold one end of the cassette under said frontward resilient force.

* * * * *